(12) United States Patent
Kim

(10) Patent No.: US 10,618,381 B2
(45) Date of Patent: *Apr. 14, 2020

(54) THERMAL MANAGEMENT SYSTEM FOR VEHICLE

(71) Applicants: Hyundai Motor Company, Seoul (KR); Kia Motors Corporation, Seoul (KR)

(72) Inventor: Jae Yeon Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 121 days.

This patent is subject to a terminal disclaimer.

(21) Appl. No.: 15/945,757

(22) Filed: Apr. 5, 2018

(65) Prior Publication Data

US 2019/0160917 A1    May 30, 2019

(30) Foreign Application Priority Data

Nov. 29, 2017  (KR) .................. 10-2017-0161531

(51) Int. Cl.
| | | |
|---|---|---|
| *B60H 1/06* | (2006.01) | |
| *B60H 1/32* | (2006.01) | |
| *B60H 1/00* | (2006.01) | |

(52) U.S. Cl.
CPC ......... *B60H 1/323* (2013.01); *B60H 1/00271* (2013.01); *B60H 1/00899* (2013.01); *B60H 1/06* (2013.01); *B60H 1/32284* (2019.05); *B60H 2001/00928* (2013.01); *B60H 2001/00949* (2013.01)

(58) Field of Classification Search
CPC ............... B60H 1/32284; B60H 1/323; B60H 2001/00928; B60H 2001/00949; B60H 1/00328

See application file for complete search history.

(56) References Cited

U.S. PATENT DOCUMENTS 6,616,059 B2 * 9/2003 Sabhapathy ............. B60H 1/04
                                                                237/12.3 B
6,640,889 B1 * 11/2003 Harte ................. B60H 1/00885
                                                                165/202

(Continued)

*Primary Examiner* — Filip Zec
(74) *Attorney, Agent, or Firm* — Mintz Levin Cohn Ferris Glovsky and Popeo, P.C.; Peter F. Corless

(57) ABSTRACT

A vehicle thermal management system is provided. The thermal management system for includes a cooling apparatus that circulates a coolant cooled in a radiator through a coolant line to cool a driving device in the vehicle. A main centralized energy (CE) module is connected to the cooling apparatus via the coolant line, selectively heat-exchanges heat energy generated during a condensation and evaporation of the refrigerant circulating the inside with a coolant, and supplies the coolant of low temperature or high temperature to a cooling heat exchanger or a heating heat exchanger. A sub CE module is connected to the cooling apparatus through the coolant line, using the coolant received through the coolant line during the condensation of the coolant circulating the inside, and heat-exchanges heat energy generated during an evaporation of the refrigerant with an air to supply the air of low temperature to a controller in the vehicle.

12 Claims, 2 Drawing Sheets

(56) References Cited

U.S. PATENT DOCUMENTS

| | | | |
|---|---|---|---|
| 6,971,246 B2* | 12/2005 | Kurata | B60H 1/00328 62/196.4 |
| 9,707,823 B2* | 7/2017 | Feuerecker | B60H 1/00921 |
| 2016/0023532 A1* | 1/2016 | Gauthier | B60L 50/66 62/243 |

* cited by examiner

THERMAL MANAGEMENT SYSTEM FOR VEHICLE

CROSS-REFERENCE TO RELATED APPLICATION

This application claims priority to and the benefit of Korean Patent Application No. 10-2017-0161531 filed in the Korean Intellectual Property Office on Nov. 29, 2017, the entire contents of which are incorporated herein by reference.

BACKGROUND

(a) Field of the Invention

The present invention relates to a thermal management system for a vehicle, and more particularly, to a thermal management system for a vehicle that enables a cooling of a controller along with a cooling and a heating of an interior of an autonomous vehicle.

(b) Description of the Related Art

In general, an air-conditioning system used to adjust an indoor temperature of the vehicle is provided within the vehicle. The air conditioning system maintains an interior temperature of the vehicle at an appropriate temperature regardless of a change in an outside temperature and is configured to heat or cool the interior of the vehicle by a heat exchange by an evaporator in a process in which a refrigerant discharged by driving a compressor passes through a condenser, a receiver drier, an expansion valve, and an evaporator and is then circulated to the compressor again.

In other words, in a cooling mode in summer or warmer weather temperatures, in the air conditioning system, a high-temperature and high-pressure gas phase refrigerant compressed by the compressor is condensed through the condenser and then is evaporated in the evaporator through the receiver drier and the expansion valve to decrease an interior temperature and humidity. With the development of the autonomous vehicle, a radar, a LIDAR, a GPS, etc. required for the auto driving, various sensors, and a controller operating the components are mounted in a trunk compartment of the vehicle.

However, in the above-described autonomous vehicle, as a separate cooling system for cooling the controller of which a calorific value is relatively large is required along with the air-conditioning system for cooling or heating the interior of the vehicle, there are drawbacks that a cost increases and there is a limitation in the space required for installing the cooling system inside the narrow vehicle. Additionally, a size and a weight of a cooling module disposed in front of the vehicle are increased, and a layout of connection pipes supplying a refrigerant or a coolant to the air-conditioning system, the cooling system of the controller, and a battery cooling system is complex within the engine compartment.

The above information disclosed in this section is merely for enhancement of understanding of the background of the invention and therefore it may contain information that does not form the prior art that is already known in this country to a person of ordinary skill in the art.

SUMMARY

The present invention provides a thermal management system for a vehicle exchanging heat for heat energy generated from the refrigerant during a condensation and an evaporation of the refrigerant in the autonomous vehicle with the refrigerant, adjusting the interior temperature of the vehicle using the heat-exchanged coolant of low temperature or high temperature, and supplying heat energy of low temperature generated during the evaporation of the refrigerant to the controller through air for the efficiently cooling.

A thermal management system for a vehicle according to an exemplary embodiment of the present invention may include a cooling apparatus configured to circulate a coolant cooled in a radiator through a coolant line to cool a driving device provided within a vehicle; a main centralized energy (CE) module connected to the cooling apparatus via the coolant line, selectively heat-exchanging heat energy generated during a condensation and evaporation of the refrigerant circulating the inside with a coolant, and configured to respectively supply the coolant of low temperature or high temperature to a cooling heat exchanger or a heating heat exchanger; and a sub CE module connected to the cooling apparatus via the coolant line, using the coolant received through the coolant line during the condensation of the coolant circulating the inside, and heat-exchanging heat energy generated during an evaporation of the refrigerant with an air to supply the air of low temperature to a controller mounted within the vehicle.

The cooling apparatus may further include a first water pump disposed in the coolant line and configured to circulate the coolant cooled in the radiator. The refrigerant circulating in the main CE module and the sub CE module may be R152-a, R744, or R290. The sub CE module may include a second compressor configured to compress the coolant; a second condenser connected to the second compressor via a second refrigerant line and heat-exchanging the compressed refrigerant supplied from the second compressor with the coolant supplied inside through the coolant line to be condensed; a second expansion valve connected to the second condenser via the second refrigerant line and expanding the refrigerant; and a second evaporator connected to the second expansion valve through the second refrigerant line, evaporating the refrigerant supplied from the second expansion valve with the air supplied through an operation of a blower fan through the heat exchange, and supplying the evaporated refrigerant to the second compressor.

A connection duct may be disposed between the controller and the second evaporator. The blower fan may be positioned at the opposite side of the connection duct via the second evaporator. The air supplied from the blower fan may be supplied to the controller through the connection duct with the cooled state while passing through the second evaporator.

The main CE module may include a first compressor configured to compress the refrigerant; a first condenser connected to the first compressor via a first refrigerant line and heat-exchanging the compressed coolant supplied from the first compressor with the coolant supplied inside through the coolant line to be condensed; a first expansion valve connected to the first condenser via the first refrigerant line and expending the refrigerant; and a first evaporator connected to the first expansion valve via the first refrigerant line, connected to the cooling heat exchanger circulating the coolant through the cooling line, evaporating the refrigerant supplied from the first expansion valve with the coolant received through the air-conditioning line through the heat exchange, and supplying the evaporated refrigerant to the first compressor.

The first condenser may be connected to the heating heat exchanger via a heating line and may be configured to supply the coolant of which the temperature increases while condensing the refrigerant to the heating heat exchanger through the heating line. A third water pump circulating the coolant to the heating heat exchanger and the first condenser may be disposed in the heating line. The first evaporator may be configured to supply the coolant of which the temperature decreases while evaporating the refrigerant through the heat exchange with the coolant to the cooling heat exchanger through the cooling line. A second water pump circulating the coolant to the cooling cooler and the first evaporator may be disposed at the cooling line.

As above-described, the thermal management system for the vehicle according to an exemplary embodiment of the present invention selectively heat-exchanges the heat energy generated from the refrigerant during the condensation and evaporation of the refrigerant circulated in the autonomous vehicle with the coolant, adjusts the interior temperature of the vehicle using the heat-exchanged coolant of low temperature or high temperature, and supplies the heat energy of low temperature generated during the evaporation of the refrigerant to the controller through the air for being efficiently cooled, thereby simplifying the entire system and the layout of the connection pipe circuiting the coolant.

Additionally, since the present invention applies the main CE module and the sub CE module in which the coolant is circuited inside to configure the entire system, a production cost reduction and a weight reduction are achieved through the modularization of the device, and a space utilization may be improved. Since the present invention uses R152-a, R744, or R290 as the refrigerant of low cost and high performance, the operation efficiency may be improved, and the occurrence of a noise, a vibration, and a motion instability may be prevented compared with a conventional air-conditioner.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

DESCRIPTION OF SYMBOLS

Figure 1:
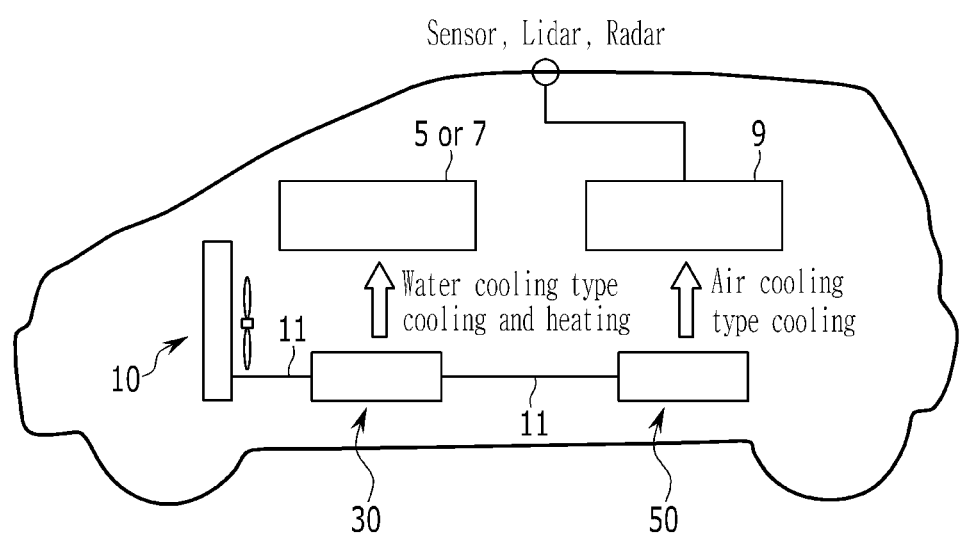
FIG. 1 is a schematic view of a thermal management system for a vehicle according to an exemplary embodiment of the present invention.

3: driving device
5: cooling heat exchanger
5a: air-conditioning line
5b: second water pump
7: heating heat exchanger
7a: heating line
7b: third water pump
9: controller
10: cooling apparatus
11: coolant line
13: radiator
15: first water pump
30: main CE module
31: first refrigerant line
33: first compressor
35: first condenser
37: first expansion valve
39: first evaporator
50: sub CE module
51: second refrigerant line
53: second compressor
55: second condenser
57: second expansion valve
59: second evaporator
61: blower fan
63: connection duct

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings. Exemplary embodiments disclosed in the present specification and the constructions depicted in the drawings are only the exemplary embodiments of the present invention, and do not cover the entire scope of the present invention. Therefore, it will be understood that there may be various equivalents and variations at the time of the application of this specification. The unrelated parts to the description of the exemplary embodiments are not shown to make the description clear and like reference numerals designate like element throughout the specification. Further, the sizes and thicknesses of the configurations shown in the drawings are provided selectively for the convenience of description, so that the present invention is not limited to those shown in the drawings and the thicknesses are exaggerated to make some parts and regions clear.

Figure 2:
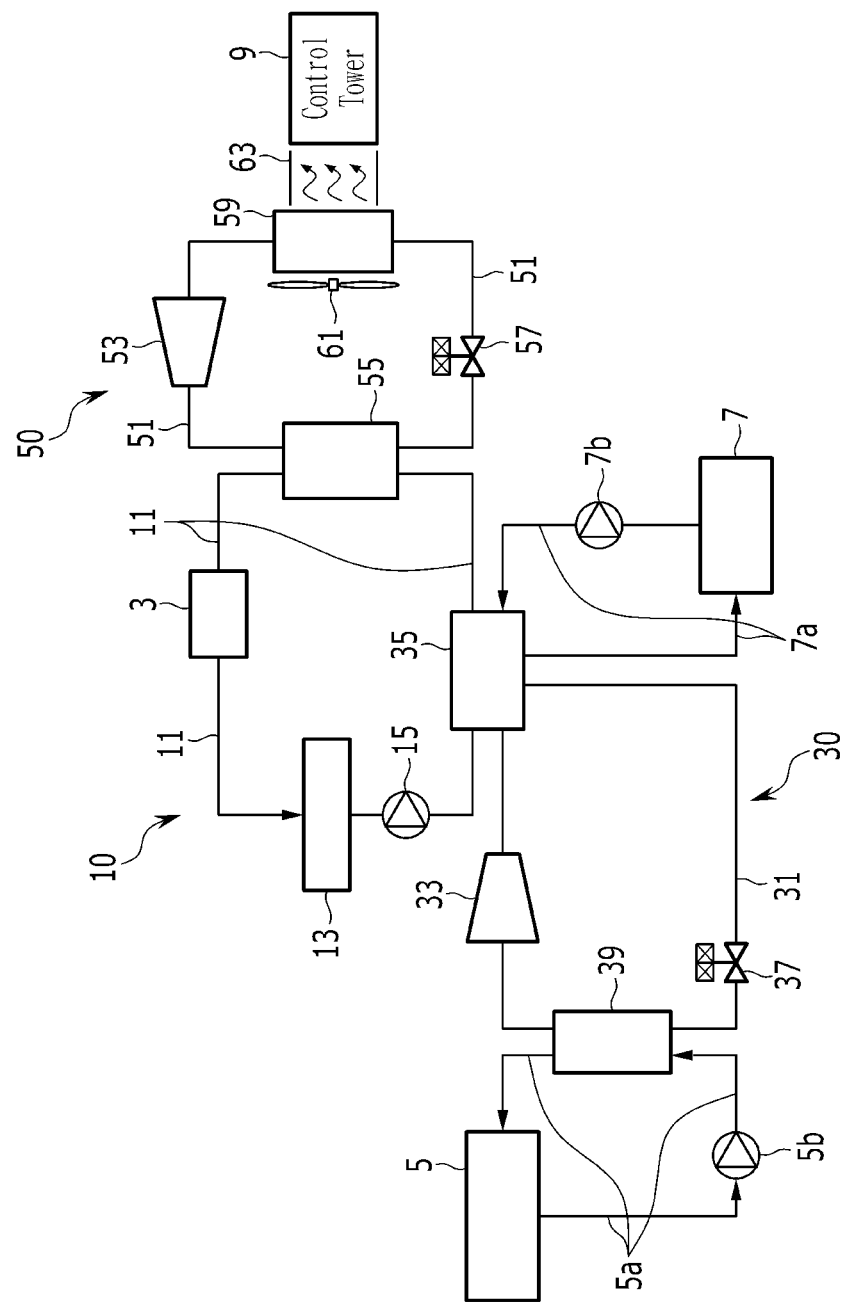
FIG. 2 is a block diagram of a thermal management system for a vehicle according to an exemplary embodiment of the present invention.

FIG. 1 is a schematic view of a thermal management system for a vehicle according to an exemplary embodiment of the present invention, and FIG. 2 is a block diagram of a thermal management system for a vehicle according to an exemplary embodiment of the present invention. Referring to FIG. 1 and FIG. 2, a thermal management system for a vehicle according to an exemplary embodiment of the present invention is applied to an autonomous vehicle.

In the vehicle, a cooling apparatus 10 is provided for cooling a driving device 3 including an engine, a motor, and a battery including a fuel cell to be driven. The cooling apparatus 10 may be disposed in a front portion of the vehicle and may be configured to circulate the coolant cooled in the radiator 13 through a coolant line 11 to cool the driving device 3. Particularly, the cooling apparatus 10 may further include a first water pump 15 disposed in the coolant line 11 and configured to circulate the coolant cooled in the radiator 13.

In addition, a radar, a LIDAR, a global positioning system (GPS) required for the auto driving, and various sensors are provided within the vehicle and a controller 9 is provided to operate such components. Particularly, the thermal management system for the vehicle according to an exemplary embodiment of the present invention may perform the cooling and the heating of the vehicle and may further include a main CE module 30 and a sub CE module 50 to cool the controller 9.

First, the main CE module 30 may be connected to the cooling apparatus 10 via the coolant line 11. The main centralized energy (CE) module 30 may be configured to selectively heat-exchange heat energy generated during the condensation and the evaporation of the refrigerant circulating the inside with the coolant and supply the heat-exchanged coolant of low temperature or high temperature to the cooling heat exchanger 5 or the heating heat exchanger 7. In particular, the refrigerant may be R152-a, or R744, or R290, having relatively low cost and high performance.

In other words, the coolant of low temperature may be supplied to the cooling heat exchanger 5 through a cooling line 5a, and the coolant of high temperature may be connected to the heating heat exchanger 7 via a heating line 7a. The cooling heat exchanger 5 and the heating heat exchanger 7 may be provided in the air-conditioning system of the vehicle. The main CE module 30 may include a first compressor 33, a first condenser 35, a first expansion valve 37, and a first evaporator 39 connected via a first refrigerant line 31.

First, the first compressor 33 may be configured to compress the refrigerant exhausted from the first evaporator 39. The first condenser 35 may be connected to the first compressor 33 via the first refrigerant line 31. The first condenser 35 may be configured to heat-exchange the compressed refrigerant supplied from the first compressor 33 with the coolant supplied to the inside through the coolant line 11 to be condensed. In particular, the first condenser 35 may be connected to the heating heat exchanger 7 via the heating line 7a. Accordingly, the first condenser 35 heat-exchanges the received refrigerant with the coolant received inside through the heating line 7a and the coolant line 11 to be condensed and supplies heat energy during the condensation of the refrigerant to the coolant, thereby increasing the temperature of the coolant.

When the heating of the vehicle is required, the coolant of which the temperature is increased may be supplied to the heating heat exchanger 7 through the heating line 7a. A third water pump 7b may be disposed in the heating line 7a and may be configured to circulate the coolant to the heating heat exchanger 7 and the first condenser 35. In the present exemplary embodiment, the first expansion valve 37 may be connected to the first condenser 35 via the first refrigerant line 31 and may be configured to receive the coolant passing through the first condenser 35 to be expanded.

The first expansion valve 37 may be constructed mechanically or electronically. Additionally, the first evaporator 39 may be connected to the first expansion valve 37 via the first refrigerant line 31. The first evaporator 39 may be connected to the cooling heat exchanger 5 circulated with the coolant through the cooling line 5a. Accordingly, the first evaporator 39 may evaporate the refrigerant supplied from the first expansion valve 37 with the coolant received through the cooling line 5a by the heat exchange and may be configured to supply heat energy of low temperature generated during the evaporation of the refrigerant to the coolant to decrease the temperature of the coolant.

When the cooling of the vehicle is required, the coolant of low temperature of which the temperature decreases may be supplied to the cooling heat exchanger 5 through the cooling line 5a. Particularly, a second water pump 5b may be disposed in the cooling line 5a and may be configured to circulate the coolant to the cooling heat exchanger 5 and the first evaporator 39. In other words, while evaporating the refrigerant with the coolant through the heat exchange, the first evaporator 39 may be configured to supply the coolant of which the temperature decreases to the cooling heat exchanger 5 during the operation of the cooling mode of the vehicle. Additionally, the coolant exhausted from the first evaporator 39 may be supplied to the first compressor 33 through the first refrigerant line 31.

The above-configured main CE module 30 may be formed of a modular structure in which all constituent elements are disposed inside the housing and are connected via a relatively short connection pipe forming the first refrigerant line 31. In the present exemplary embodiment, the sub CE module (50: Sub Centralized Energy Module) may be connected to the cooling apparatus 10 via the coolant line 11. The sub CE module 50 may use the coolant received through the coolant line 11 during the condensation of the coolant circulating the inside and heat-exchange the heat energy generated during the evaporation of the refrigerant with the air, to thus supply the air of low temperature to the controller 9 mounted within the vehicle. The coolant may be R152-a, or R744, or R290 of low cost and high performance.

In other words, the sub CE module 50 may use the air during the evaporation of the refrigerant and may be configured to supply the air of low temperature cooled through the heat exchange with the coolant to the controller 9 for the efficiency cooling. Particularly, the sub CE module 50 may include a second compressor 53, a second condenser 55, a second expansion valve 57, and a second evaporator 59 connected via a second refrigerant line 51.

First, the second compressor 53 may be configured to compress the refrigerant exhausted from the second evaporator 59. The second condenser 55 may be connected to the second compressor 53 via the second refrigerant line 51. The second condenser 55 may be configured to heat-exchange and condense the compressed refrigerant supplied from the second compressor 53 with the coolant supplied to the inside through the coolant line 11. The second expansion valve 57 may be connected to the second condenser 55 through the second refrigerant line 51 and may be configured to receive and expand the refrigerant passing through the second condenser 55.

The second expansion valve 57 may be configured mechanically or electronically. Additionally, the second evaporator 59 may be connected to the second expansion valve 57 via the second refrigerant line 51. The second evaporator 59 may evaporate the refrigerant supplied from the second expansion valve 57 with the air supplied through the operation of the blower fan 61 using the heat exchange. Particularly, a connection duct 63 that guides the air blown from the blower fan 61 and passing through the second evaporator 59 to the controller 9 may be disposed between the controller 9 and the second evaporator 59.

Further, the blower fan 61 may be positioned at the opposite side of the connection duct 63 via the second evaporator 59. Accordingly, the air supplied from the blower fan 61 may be supplied more smoothly with the cooled state to the controller 9 through the connection duct 63 while passing through the second evaporator 59. In other words, as the air blown through the operation of the blower fan 61 is supplied to the controller 9 with the cooled state while passing through the second evaporator 59, the controller 9 may be further efficiency cooled.

In the present exemplary embodiment, the connection duct 63 may be connected to the controller 9, however it is not limited thereto, and the connection duct 63 may also be connected to the radar, the LIDAR, the GPS, and the various sensors that are mounted within the vehicle. The above-configured sub CE module 50 may be formed of the modular structure in which all constituent elements are disposed inside the housing and are connected via a relatively short connection pipe forming the second refrigerant line 51. On the other hand, in the present exemplary embodiment, the cooling heat exchanger 5, the heating heat exchanger 7, the first and second condenser 35 and 55, and the first evaporator 39 may be all formed of a water cooling type heat exchanger, and the controller 9 and the second evaporator 59 may be formed of an air cooling type heat exchanger.

Accordingly, as the above-configured thermal management system for the vehicle according to an exemplary embodiment of the present invention selectively heat-exchanges the heat energy generated from the refrigerant during the condensation and evaporation of the refrigerant circulated at the main CE module 30 in the autonomous vehicle with the coolant, adjusts the interior temperature of the vehicle using the heat-exchanged coolant of low temperature or high temperature, and supplies the heat energy of low temperature generated during the evaporation of the refrigerant in the sub CE module 50 to the controller 9 through the air for being efficiently cooled, thereby simplifying the entire system and the layout of the connection pipe circuiting the coolant.

Additionally, since the present invention applies the main CE module 30 and the sub CE module 50 in which the coolant is circuited inside to configure the entire system, a production cost reduction and a weight reduction may be possible through the modularization of the device, and a space utilization may be improved. Since the present invention uses R152-a, R744, or R290 as the refrigerant of low cost and high performance, the operation efficiency may be improved, and the occurrence of a noise, a vibration, and a motion instability may be prevented compared with a conventional air-conditioner.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A thermal management system for a vehicle, comprising:
   a cooling apparatus configured to circulate a coolant cooled in a radiator through a coolant line to cool a driving device mounted within the vehicle;
   a main centralized energy (CE) module connected to the cooling apparatus via the coolant line, configured to selectively heat-exchange heat energy generated during a condensation and evaporation of a first refrigerant circulating therein with the coolant, and respectively supply the coolant of a first low temperature or a high temperature to at least a cooling heat exchanger or a heating heat exchanger; and
   a sub CE module connected to the cooling apparatus via the coolant line, using the coolant received through the coolant line during the condensation of the coolant circulating the inside, and configured to heat-exchange heat energy generated during an evaporation of a second refrigerant with an air to supply the air of a second low temperature to a controller mounted within the vehicle.

2. Thermal management system for the vehicle of claim 1, wherein the cooling apparatus further includes a first water pump disposed in the coolant line and configured to circulate the coolant cooled in the radiator.

3. Thermal management system for the vehicle of claim 1, wherein the first refrigerant circulating in the main CE module and the second refrigerant circulating in the sub CE module is R152-a, R744, or R290.

4. Thermal management system for the vehicle of claim 1, wherein the sub CE module includes:
   a second compressor configured to compress the coolant;
   a second condenser connected to the second compressor via a second refrigerant line and configured to heat-exchange the compressed coolant supplied from the second compressor with the coolant supplied therein through the coolant line to be condensed;
   a second expansion valve connected to the second condenser via the second refrigerant line and that expands the second refrigerant; and
   a second evaporator connected to the second expansion valve via the second refrigerant line, configured to evaporate the second refrigerant supplied from the second expansion valve with the air supplied through an operation of a blower fan through the heat exchange and supply the evaporated refrigerant to the second compressor.

5. Thermal management system for the vehicle of claim 4, wherein a connection duct is disposed between the controller and the second evaporator.

6. Thermal management system for the vehicle of claim 5, wherein the blower fan is disposed at the opposite side of the connection duct via the second evaporator.

7. Thermal management system for the vehicle of claim 5, wherein the air supplied from the blower fan is supplied to the controller through the connection duct with the cooled state while passing through the second evaporator.

8. Thermal management system for the vehicle of claim 1, wherein the main CE module includes:
   a first compressor configured to compress the first refrigerant;
   a first condenser connected to the first compressor via a first refrigerant line and configured to heat-exchange the compressed first refrigerant supplied from the first compressor with the coolant supplied therein through the coolant line to be condensed;

a first expansion valve connected to the first condenser via the first refrigerant line and that expands the first refrigerant; and a first evaporator connected to the first expansion valve via the first refrigerant line, connected to the cooling heat exchanger circulating the coolant through the cooling line, evaporating the first refrigerant supplied from the first expansion valve with the coolant received through the air-conditioning line through the heat exchange, and supplying an evaporated refrigerant to the first compressor.

9. Thermal management system for the vehicle of claim 8, wherein the first condenser is connected to the heating heat exchanger via a heating line and configured to supply the coolant of which the temperature increases while condensing the first refrigerant to the heating heat exchanger through the heating line.

10. Thermal management system for the vehicle of claim 9, wherein a third water pump is disposed in the heating line and is configured to circulate the coolant to the heating heat exchanger and the first condenser.

11. Thermal management system for the vehicle of claim 8, wherein the first evaporator is configured to supply the coolant of which the temperature decreases while evaporating the first refrigerant through the heat exchange with the coolant to the cooling heat exchanger through the cooling line.

12. Thermal management system for the vehicle of claim 8, wherein a second water pump is disposed at the cooling line and is configured to circulate the coolant to the cooling cooler and the first evaporator.

* * * * *